FREQUENCY DIVIDER HAVING A FIRST DECADE WITH AN ADJUSTABLE
COUNTING LENGTH THAT IS REPEATABLE
DURING EACH DIVIDER CYCLE
Filed Feb. 9, 1966
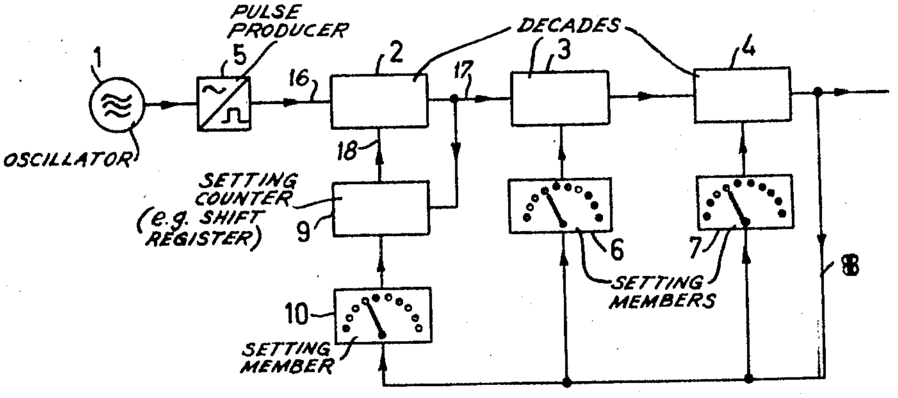
FIG.1
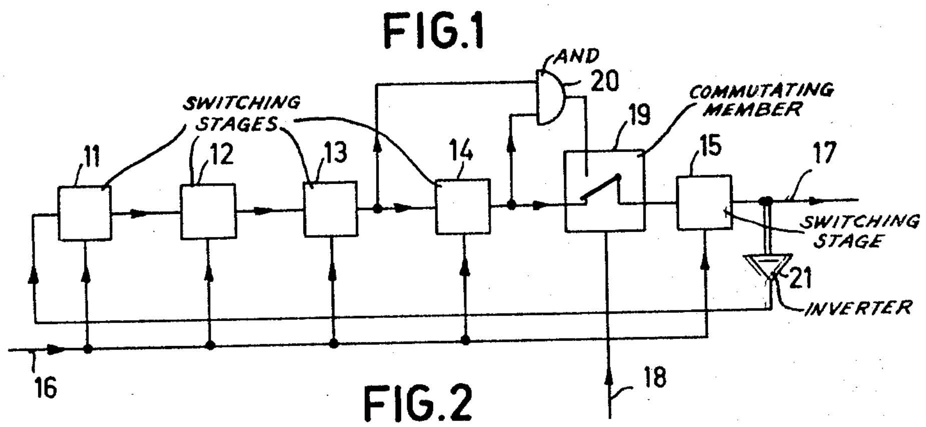
FIG.2
| | 11 | 12 | 13 | 14 | 15 |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| 6 | 0 | 1 | 1 | 1 | 1 |
| 7 | 0 | 0 | 1 | 1 | 1 |
| 8 | 0 | 0 | 0 | 1 | 1 |
| 9 | 0 | 0 | 0 | 0 | 1 |
FIG.3
INVENTOR.
MARINUS A. BOS
BY Frank R. Trifari
AGENT United States Patent Office 3,456,200

Patented July 15, 1969

3,456,200

FREQUENCY DIVIDER HAVING A FIRST DECADE WITH AN ADJUSTABLE COUNTING LENGTH THAT IS REPEATABLE DURING EACH DIVIDER CYCLE

Marinus Anton Bos, Hilversum, Netherlands, assignor, by mesne assignments, to U.S. Philips Corporation, New York, N.Y., a corporation of Delaware Filed Feb. 9, 1966, Ser. No. 526,252

Claims priority, application Netherlands, Feb. 16, 1965, 6501885

Int. Cl. H03k 21/32

U.S. Cl. 328—48 7 Claims

ABSTRACT OF THE DISCLOSURE

A frequency divider system of the type having a plurality of cascade connected decades, and the decades are reset in response to an output pulse of the system in order to provide adjustable division ratios. The first decade has a normal counting length and an adjustable counting length that differs from the normal length by one count, and the setting circuit for the first decade resets the first decade to its adjusted length a predetermined number of times during each cycle of the divider, as determined by an adjustable setting member.

The invention relates to an adjustable frequency divider for dividing the frequency of a high-frequency oscillator by an arbitrarily adjustable number, which frequency divider comprises an adjustable pulse counting device which is constituted by the cascade arrangement of a plurality of adjustable decades and setting members added to each individual decade.

Such adjustable frequency dividers are used inter alia in frequency-stabilizing apparatus for multi-channel generators, so-called "frequency synthesisers." A frequency divider of this type is disclosed, for example, in copending United States Patent 3,384,827.

Conventional adjustable frequency dividers have a permissible maximum frequency which is considerably lower than the permissible maximum frequency of the corresponding non-adjustable frequency divider, as a result of which, for example, a non-adjustable frequency divider suitable for frequencies up to 100 mc./s. in case of adjustability is only suitable for frequencies up to 50 mc./s.

The invention has for its object to provide an adjustable frequency divider of the aforesaid kind which has the same frequency range as the corresponding non-adjustable frequency divider, which affords the advantage that all the frequencies lying within the range of the non-adjustable frequency divider can be divided by an arbitrarily adjustable number.

A frequency divider in accordance with the invention is characterized in that the setting member added to the first decade is constituted by a control circuit which permits of setting an adjustable number of cycles of the first decade during each cycle of the pulse counting device.

The invention will now be described more fully with reference to the drawing.

FIG. 1 shows in block diagram an embodiment of a frequency divider in accordance with the invention.

FIG. 2 shows an embodiment of the first decade of the frequency divider shown in FIG. 1.

FIG. 3 illustrates a table of states of the decade shown in FIG. 2.

Referring now to FIG. 1, reference numeral 1 designates an ultra high-frequency oscillator having a frequency of, for example, approximately 100 mc./s. It is desired to divide the frequency of the oscillator by an arbitrary decimal number having an arbitrary number of decimals.

In accordance with FIG. 1, a pulse counter is available which is constituted by the cascade arrangement of a plurality of decades 2, 3 and 4. The number of decades is limited to three only by way of example and it can be enlarged according to need. Reference numeral 5 denotes a pulse producer which converts the oscillator signal into a pulse train and supplies this pulse train to the input of the first decade.

Each decade normally has a working cycle of 10 input pulses and produces during each working cycle an output pulse which is supplied to the input of the subsequent decade in the case of the first two decades or to a pulse device (not shown) in the case of the third decade. The pulse counter normally has an overall working cycle of 1000 pulses. The working cycle of the pulse counter can be adjusted to an arbitrary number of pulses by reducing the working cycle of each decade once to an arbitrarily adjustable number of pulses after each output pulse of the pulse counter. The first two decades then pass during each complete working cycle of the pulse counter through a plurality of cycles of 10 pulses and through one cycle of an arbitrary number of pulses, while the third decade passes solely through one cycle of an arbitrary number of pulses. Let it be assumed by way of example that the working cycle of decade 2 is adjusted to 2 pulses, that of decade 3 to 6 pulses and that of decade 4 to 4 pulses, by adjusting setting members 10, 6 and 7 respectively. It can then be verified in a simple manner that the pulse counter has a working cycle of 352 pulses. With this number of input pulses, the first decade produces 36 output pulses, the second decade 4 output pulses and the third decade just 1 output pulse.

The manner in which the working cycle of a decade can be adjusted depends upon the structure of the decade. In this application, decades are mainly considered which are composed of bistable switching elements such as flip-flops, in which case the combinations of the states of the flip-flops characterize the different counting positions of the decade. This kind of decade normally permits of obtaining ten different combinations of states which are passed in order of succession when pulses are supplied to the decade. The working cycle of such a decade can be arbitrarily adjusted firstly by modifying the connections between the bistable elements or secondly by pre-adjusting the bistable elements in a manner such that both in the first and in the second case a plurality of combinations of states are skipped. In the first case, a great plurality of switching elements are required to establish the desired connections between the bistable elements, while in both cases the permissible maximum repetition frequency of the input pulses is reduced by approximately a factor two. This disadvantage becomes particularly manifest in the first decade which limits the maximum frequency of the oscillator 1 which would consequently be reduced from, for example, 100 mc./s. to 50 mc./s.

FIG. 1 shows the setting members 6 and 7 which are added to the decades 3 and 4, respectively, and which receive through a lead 8 the output pulses of the pulse counter. Each of these setting members can be adjusted to 10 positions. After the reception of each output pulse, each of the setting members 6 and 7 once adjusts the working cycle of the associated decade to a number of pulses corresponding with the adjusted position. In the numerical example stated above, the working cycle of decade 3 is adjusted to 6 pulses, and that of decade 4 to 4 pulses. The setting members 6 and 7 and the decades 3 and 4 may be constructed in a usual manner, such as described in the aforementioned reference, which is of no importance in this case.

The first decade of the pulse counter is now considered in which a new and advantageous adjusting method is used which does not bring about a reduction of the maximum permissible pulse repetition frequency. A setting member 10 and a setting counter 9 are added to the first decade. The new adjusting method is first described in principle with reference to a numerical example and it is assumed that the first decade has a working cycle which can be commutated from 10 pulses to 9 pulses, and conversely. Let it be assumed that the working cycle must be adjusted to 352 pulses. In accordance with the new adjusting method, the working cycle of the first decade is adjusted in this case eight times in succession to 9 pulses during each working cycle of the pulse counter. The first decade then passes during each overall working cycle of the pulse counter through 28 working cycles of 10 pulses and through 8 working cycles of 9 pulses and produces 36 output pulses. This number is just equal to the number which would be produced if the first decade passes through one cycle of 2 pulses and through 35 working cycles of 10 pulses.

A possible embodiment of the first decade is now described with reference to FIG. 2. This decade comprises the switching stages 11 to 15, an input 16, an output 17 and a control signal input 18. The pulses of the pulse producer 5 of FIG. 1 are supplied to the input 16 and pulses are derived from the output 17 and are supplied to the subsequent decade. Reference numeral 19 denotes a commutating member which is represented in the figure by a change-over contact. In practice, this commutating member is constituted by electronic switching elements. Reference numeral 20 denotes an "and" circuit arrangement one of the two inputs of which is connected to the output of the switching stage 13 while the other input is connected to the output of the switching stage 14. The commutating member is controlled by a control signal which is supplied to the input 18 so that the commutating member occupies the position shown in the absence of a control signal, while the commutating member occupies the other position in the presence of a control signal. In the position shown of the commutating member 19, the output of switching stage 14 is connected through the commutating member to the input of switching stage 15, while in the other position the output of the "and" circuit arrangement 20 is connected through the commutating member to the input of switching stage 15. The output of switching stage 15 is connected through an inverting circuit 21 to the input of switching stage 11, while the switching stages 11 to 14 are connected directly in cascade arrangement. The input 16 is connected to all switching stages 11 to 15 and supplies the input pulses to all switching stages. Each switching stage has two stable states which are designated by 0 and 1 and produces in these states different output pulses which are likewise designated by 0 and 1. Upon the reception of a pulse from the input 16, each switching stage operates so that the switching stage is set to state 1 if the input signal is a 1-signal or remains in state 1 if this state has already been adjusted, while the switching stage is set to state 0 if the input signal is a 0-signal or remains in state 0 if this state has already been adjusted. Let it first be assumed that no control signal is supplied to the input 18 and further that at a given instant the switching stages are all in the 0-state, as is shown on the line of the table of FIG. 3 designated by the numeral 0. In this table, each line indicates the combination of states of the switching stages 11 to 15 which is characteristic of a counting position (0 to 9) of the decade. At the considered instant, only the input signal of the switching stage 11 is a 1-signal which is constituted by the inverted 0 output signal of the switching stage 15. The next pulse supplied to the input 16 after the instant considered sets the switching stage 11 to the state 1 while all the other switching stages remain in the state 0. Each subsequent pulse invariably commutates only one switching stage, in which case the decade successively passes through the counting positions 1 to 9. The tenth pulse after the considered instant sets the decade from counting position 9 to counting position 0. A complete working cycle of the decade, which started at the considered instant, has now ended and a new working cycle begins.

The described working cycle is a cycle of 10 pulses and it will now be proved that the working cycle can be reduced in a simple manner to a cycle of 9 pulses without the favourable high-frequency properties of the decade being adversely affected. Let it be assumed that at the instant at which the decade is set from the counting position 9 to the counting position 0, that is to say at the beginning of a new working cycle, a control signal is supplied to the input 18. The commutating member 19 commutates before the subsequent input pulse is received and now supplies the output signal of the "and" circuit 20 to the input of switching stage 15. The "and" circuit produces a 1-signal if the two input signals are 1-signals and produces a 0-signal if at least one of the two input signals is a 0-signal. With the aid of the table illustrated in FIG. 3, it can be verified that in counting position 8 for the first time a difference exists between the output signal of the "and" circuit 20 and the output signal of the switching stage 14. In the counting position 8, the output signal of the "and" circuit 20 is a 0-signal. The next input pulse after the instant at which the decade has been set to counting position 8 then sets both the switching stage 14 and the switching stage 15 to the 0 state, as a result of which the decade skips the counting position 9 and is set directly from counting position 8 to counting position 0. As can be seen from the table, the switching stages are each commutated each time after 4 or 5 successive input pulses in case of a working cycle of 9 pulses and each time after 5 input pulses in case of a working cycle of 10 pulses. The maximum permissible pulse repetition frequency is approximately the same for both cases. This is not the case if the working cycle is arbitrarily adjustable, in which event the switching stages are commutated each time after 1, 2 or 3 input pulses. In the most unfavourable case in which a switching stage is twice commutated by two successive input pulses, the maximum permissible pulse repetition frequency is considerably reduced, i.e. by approximately a factor 2.

The setting number 10 shown in FIG. 1 has 10 positions which are individually adjustable. The output pulses of the pulse counter are supplied through the lead 8 to the setting member 10. After the reception of a pulse the setting member 10 sets the setting counter 9. The setting counter then produces during a plurality of successive working cycles of decade 2 a control signal and supplies this signal to the input 18 of the first decade, as a result of which the first decade passes through a plurality of working cycles of 9 pulses. The number is determined by the position of the setting member 10 and when this number has been attained, the setting counter is stopped. The setting counter 9 counts the working cycles of the first decade which have a repetition frequency which is considerably lower, i.e. by a factor 10 or 9 lower, than that of the input pulses of the first decade. The setting counter can then be realized without difficulty and it may take the form of a linear shift register having 9 stages, in which case the operation can be stopped when an arbitrary stage is attained by means of mechanical contacts which are controlled by the setting member 10. In this case, for example, the setting member 10 may consist of a plurality of contacts connected to preset the shift register in parallel in response to the pulse on line 8.

The said adjusting method has the additional advantage that the pulse repetition frequency of the input pulses of the second decade is lower by at least a factor 9 than the pulse repetition frequency of the input pulses of the first decade. The second decade can then be realized in a simple manner and at low costs with the aid of switching elements having less satisfactory high-frequency properties.

It should be noted that many modifications of the embodiments shown in FIGS. 1 and 2 are possible, a few of which will be briefly described. Let it be assumed just as in the foregoing that the pulse counter must have a working cycle of 352 pulses and that the working cycle of decade 4 is adjusted once to 4 pulses, i.e. by adjusting setting member 7 for position four and that of decade 3 to 6 pulses, i.e. by adjusting setting member 6 for position 6. The first decade must then produce 36 output pulses during each working cycle of the pulse counter. This number can be produced if an additional pulse is added to the output pulses of the first decade and if during each working cycle of the pulse counter the first decade passes twice through a cycle of 11 pulses. According to this modification, the first decade is constructed so that the working cycle can be commutated from 10 pulses to 11 pulses, and conversely. Other modifications are connected with the structure of the first decade which can be constituted by the cascade arrangement of a quinary counting stage and a binary counting stage. The working cycle can then be raised by 5 pulses in one step by suppressing an output pulse of the quinary counting stage, while the working cycle can be reduced by 5 pulses in one step by adding an additional pulse to the output pulses of the quinary counting stage. If it is required, for example, that the first decade passes through 8 cycles of 11 pulses, the same result can be obtained as when an output pulse of the quinary counting stage is suppressed and the decade passes through 3 cycles of 11 pulses. If it is required, for example, that the first decade passes through 8 cycles of 9 pulses, the same result can be obtained as when an additional pulse is added to the output pulses of the quinary counting stage and the decade passes through three cycles of 9 pulses. The modifications all have in common that a setting member is available which, in accordance with the desired effect, adjusts the working cycle of the first decade once or several times during each working cycle of the pulse counter to a number of pulses differing by unity from the normal number of 10.

What is claimed is:

1. A source of high frequency oscillations, and means for dividing the frequency of said oscillations by an arbitrary number, said dividing means comprising an input circuit connected to said source, an output circuit, a plurality of decade counting circuits connected in cascade between said input and output circuits, adjustable setting means connected between said output circuit and the first decade circuit for varying the counting cycle of said first decade circuit in response to each output pulse of said dividing means, and adjustable counter means responsive to the output of said first decade connected between said setting means and said first decade circuit for varying the length of the counting cycle of said first decade circuit for an adjustable number of counting cycles of said first decade circuit.

2. A source of high frequency oscillations, and means for dividing the frequency of said oscillations by an arbitrary number, said dividing means comprising an input circuit connected to said source, an output circuit, a plurality of decade counting circuits connected in cascade between said input and output circuits, and setting means connected between said first decade circuit and said output circuit, said setting means comprising adjustable pulse counting means responsive to the output of said first decade circuit for varying the counting cycle of said first decade circuit for an adjustable number of cycles of said first decade circuit and means responsive to the output of said dividing means for resetting said pulse counting means for each cycle of said divider means.

3. The circuit of claim 2 in which said pulse counting means comprises shift register means.

4. The circuit of claim 2 in which said first decade circuit comprises commutating means responsive to said pulse counting means for changing the counting cycle of said first decade circuit.

5. A source of high frequency oscillations, and means for dividing the frequency of said oscillations by an arbitrary number, said dividing means comprising an input circuit connected to said source, an output circuit, a plurality of decade counting circuits connected in cascade between said input and output circuits, separate setting means connected to each decade circuit whereby the counting cycle of each decade circuit is adjustable in response to each output pulse of said divider means, and adjustable counter means between the setting means and said first decade circuit responsive to the output of said first decade circuit for varying the length of the counting cycle of said first decade circuit for an adjustable number of counting cycles of said first decade circuit.

6. The circuit of claim 5 in which said first decade circuit comprises a plurality of cascade connected bistable switching stages, inverting means for coupling the output of the last stage to the input of the first stage, means applying input pulses to each of said stages, whereby each stage changes its state in response to an input pulse only when the preceding stage has a different state, AND circuit means connected to the output of two adjacent stages, and commutating means for connecting the input of the stage after said two stages to the output of said AND circuit means.

7. A source of high frequency oscillations, and means for dividing the frequency of said oscillations by an arbitrary number, said dividing means comprising an input circuit, an output circuit, and a plurality of counting stages connected in cascade between said input and output circuits, the first counting stage having a control terminal, means for dividing the frequency of oscillations applied thereto by a first predetermined number in the absence of an adjusting voltage at said control terminal, and means for dividing the frequency of oscillations applied thereto by a second predetermined number in response to the application of an adjusting voltage to said control terminal, said dividing means further comprising setting means connected to apply an adjusting potential to said control terminal for a predetermined adjustable number of counting cycles of said first dividing stage in response to each output pulse from said dividing means.

References Cited

UNITED STATES PATENTS

| | | | |
|---|---|---|---|
| 2,563,841 | 8/1951 | Jensen | 328—48 XR |
| 3,147,442 | 9/1964 | Fritzsche et al. | 328—45 XR |
| 3,369,183 | 2/1968 | Mester | 328—48 |

ARTHUR GAUSS, Primary Examiner

STANLEY D. MILLER, Assistant Examiner

U.S. Cl. X.R.

307—224, 226